United States Patent [19]

Massarelli et al.

[11] Patent Number: 4,535,438
[45] Date of Patent: Aug. 13, 1985

[54] TURNTABLE PLATTER FOR RECORD PLAYERS

[75] Inventors: Liberto Massarelli, Vasto; Luigi Capriotti, Porto d'Ascoli, both of Italy

[73] Assignee: Società Italiana Vetro-SIV-S.p.A., Italy

[21] Appl. No.: 407,734

[22] Filed: Aug. 13, 1982

[30] Foreign Application Priority Data

Sep. 2, 1981 [IT] Italy ............... 23743 A/81

[51] Int. Cl.³ ............................................. G11B 3/60
[52] U.S. Cl. ................................. 369/264; 369/271
[58] Field of Search ............ 369/263, 264, 258, 271, 369/266 US, 176

[56] References Cited

U.S. PATENT DOCUMENTS

| 1,334,690 | 3/1920 | Davis | 369/264 |
| 1,436,790 | 11/1922 | Bowman | 369/271 |
| 3,767,865 | 10/1973 | Schuller et al. | 369/264 |

FOREIGN PATENT DOCUMENTS

| 2658993 | 6/1978 | Fed. Rep. of Germany | 369/364 |
| 2719920 | 11/1978 | Fed. Rep. of Germany | 369/271 |
| 2477747 | 9/1981 | France | 369/263 |
| 2483661 | 12/1981 | France | 369/271 |
| 1190002 | 10/1978 | Japan | 369/264 |
| 150102 | 11/1980 | Japan | 369/73 |

Primary Examiner—Steven L. Stephan
Attorney, Agent, or Firm—McGlew and Tuttle

[57] ABSTRACT

A turntable platter for record players, consisting of two layers one of glass and one of plastic, lying one on top of the other. The plastic layer can be of a thermoplastic and/or thermosetting material such as polycarbonate, polyacrylic, polystyrene or the like. The glass guarantees flatness, rigidity and pleasant appearance of the platter, such features not always being obtainable from the already known metal platters, while the plastic, guarantees light weight associated with such material. The glass-plastic combination in the turntable platter represents considerable progress in the particular industrial field as it guarantees the absorption of spurious vibrations, and secondly, optimum sound reproduction quality. The glass and plastic layers can be joined together by means of adhesive or pushed together and can also be of different sizes and shapes. The turntable platter can be provided with an upper layer, preferably less than one micron thick, of conductive material.

1 Claim, 2 Drawing Figures

U.S. Patent  Aug. 13, 1985  4,535,438
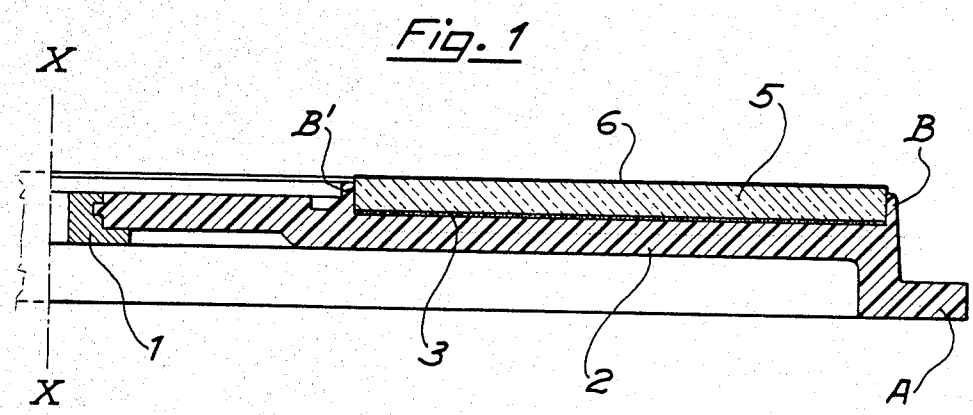
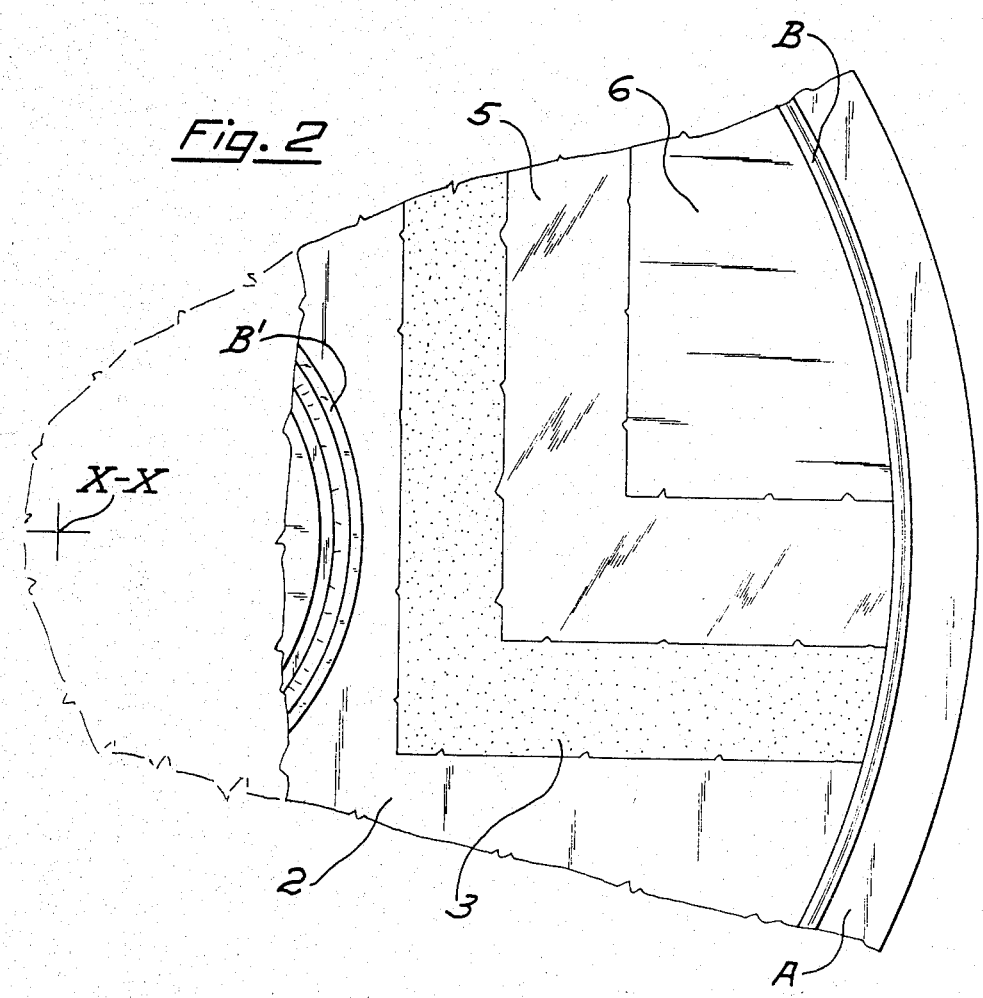

4,535,438

TURNTABLE PLATTER FOR RECORD PLAYERS

FIELD AND BACKGROUND OF THE INVENTION

This invention relates to a turntable platter for record players, consisting of a glass and a plastic layer, one on top of the other, which confers to the platter the inherent characteristics of these materials, namely, flatness, rigidity, attractive appearance and light-weight, but above all they permit considerably improved quality of sound reproduction.

In order to understand the importance of the invention it should be above all emphasized that during the last few years in the record player industry, considerable evolution has taken place in the electronic components, while the "mechanical" progress has been much slower.

It is only necessary to go back to 1978 to find turntable platters for high quality record players first being widely provided with a "mat". This accessory was able to ensure greater fidelity in sound reproduction as it acted as a damping means for the primary spurious vibrations (set up by the tracking of the stylus over the groove surfaces on the gramophone record) and of secondary spurious vibrations from the plinth, with both sets of vibrations being amplified by the resonance of the metal platter. The introduction of this feature appears to have provided an appreciable but—as will be seen later on—insufficient improvement in the sound reproduction quality.

The most critical point of the sound reproduction chain "armgramophone record-platter-plinth" of a record player is without doubt the platter, which is still today being made of metal alloy, owing to the high resonance of sound which is a distintive property of metals.

The rotation of a gramophone record on the turntable platter is always accompanied by vibrations produced by the stylus tracking the side surfaces of the groove. These vibrations are a few microns in amplitude and generate spurious vibrations throughout the entire pickup system: gramophone record, arm, platter, plinth.

Such vibrations can be detected by listening to their propagation across the platter and plinth with the aid of, for example, a doctor's stethoscope placed under the plinth.

the generation of spurious vibrations is therefore inevitable. They are transmitted in the air at a velocity of 343 m/s, while the velocity of propagation in metals is about 6000 m/s.

Turntable platters for record players built up to now, as stated earlier on, of metal alloy, constitute a true centre of resonance for the vibrations.

In order to attenuate disturbances generated by such vibrations in HIFI equipment, use has been made—as already mentioned since 1978—of mats placed between the gramophone record and the platter. These mats are made of various materials such as: chamois leather, pigskin, rubber, caoutchouc, plastic, silicone and so on.

Yet another type of cover is used consisting of a thin-walled container filled with oil.

However, such mats are not free from defects which could actually give rise to a loss of sound information. Such loss can exceed 2 dB at certain frequencies with a certain amplitude, therefore it is prefectly noticeable and can appreciably change the timbre of certain instruments. In all cases, the mat can only absorb part of the spurious vibrations.

Furthermore, when the mat is thicker than 3 or 4 mm (some are up to 7 mm thick), it is necessary to adjust the pickup arm height in order to restore the horizontal position of the pickup head, and prevent increased distortion. This operation is not easy to carry out in a fault-free manner.

To sum up therefore: the problems linked with turntable platters of today are:

(a) a resonance effect due to the metal alloy of which the platter is made; and
(b) the insufficiency of the mat to absorb parasitic vibrations without detracting from the quality of the sound reproduction.

SUMMARY OF THE INVENTION

The object of the present invention is to overcome the previously described disadvantages and the Applicant has succeeded in this task by eliminating the metal alloy as a component of the turntable platter to eliminate the important resonance centre of the record player. According to the invention, the metal alloy has been replaced with a combination of a glass and a plastic layer, one on top the other. More precisely, the plastic layer consists of a layer of thermoplastic material and/or thermosetting material such as polycarbonate, polyacrylic, polystyrene or the like.

The damping properties of such materials (glass and plastic) guarantee, in accordance with the experiments carried out, the elimination of the natural vibrations of the turntable platter and the attenuation therefore of spurious vibrations from the stylus, as well as those reflected from the plinth, and at the same time guarantee optimum quality of sound reproduction, hitherto completely unthought of and never achieved in such a measure, as already said, with the various types of mats always used up till now with the already well known metal alloy turntable platters.

However, the advantages of the proposed solution are not limited to damping of spurious vibrations generated by the tracking of the stylus in the record groove. In fact, the glass and plastic prevent vibrations set up by the turntable drive motor from being transmitted to the stylus.

The record pickup system will therefore be free from vibrations by more important generation centres, namely: stylus-groove friction and the turntable drive motor.

Another advantage of the turntable platter in accordance with the invention is that one of the two materials making up the platter, glass and plastic, is preferably covered on one or both flat surfaces with a thin layer of material (normally less than one micron thick to achieve best results) through the deposition (by chemical or physical methods) of one, two or more layers of metal and/or dielectric, but in all cases a conductive coating. The so-treated surface, which normally makes up the upper surface of the platter and which will be in direct contact with the gramophone record, will be electrically conductive and therefore capable of being grounded through the turntable drive motor spindle.

Thanks to this solution, electrostatic discharges are avoided when the gramophone record is removed from the turntable platter.

Furthermore, as the upper platter surface is kept permanently discharged of electricity, dust deposit is prevented.

The turntable platter in accordance with the invention has yet another advantage.

It no longer necessitates the use of an intermediate prism for reading the stroboscopic device as the platter edge or rather its outer rim, whether of glass or plastic, is always transparent.

Therefore the reference points for the stroboscopic device can be marked anywhere on the surface of the outer edge and they are directly visible by an observer through either the upper or side surface of the turntable platter.

The Applicant has carried out various experiments in order to assess the improvements obtained from the glass-plastic turntable platter in accordance with the invention, with respect to the characteristics of turntable platters hitherto known in the art.

During the experiments, comparison was made of the graphs obtained by a spectrum analyser connected to the sound pickup of a record player on which were mounted both the glass-plastic platter and the metal platter.

The purpose of the experiments was to assess the difference in vibration damping capacity by the different platters when submitted to external excitation.

The spectrum analyzer was adjusted to a band ranging from 0 to 2.5 kHz.

In all cases tested, appreciable reduction of the spurious vibrations (even over 10 dB) was noticed when the experiments were conducted on a glass-plastic platter.

Furthermore, the degree of distortion was measured at different frequencies using a test gramophone record.

Also in these experiments, the best results were obtained with a glass-plastic platter.

A preferred embodiment of the turntable in accordance with the invention is shown in the accompanying drawings which are given as an exemplification of the principles of the invention, with no limitation to be inferred.

BRIEF DESCRIPTION OF THE DRAWINGS

In the drawings:

FIG. 1 is a diametral section of the platter; more precisely, it shows only half the platter, the other half being perfectly symmetrical.

FIG. 2 is a partial plan view, with certain parts removed, of the turntable platter for record players shown in FIG. 1.

DESCRIPTION OF THE PREFERRED EMBODIMENTS

In FIG. 1, a spindle 1 is shown to be integral with plastic part 2, disposed about an axis of rotation X of the turntable platter.

A layer of adhesive 3 can be applied between the plastic 2 and a glass layer 5 as in the solution illustrated, in order to ensure their efficient joining.

In actual practice, this adhesive layer 3 can also not be used, in which case the glass-plastic joining is made by an appropriate securing of edges BB' of the plastic part 2.

A conductive layer 6 deposited on the outer or upper surface of glass 5 is also preferably present, as it serves to keep the platter electrically discharged, which can be achieved in practice by suitably connecting said conductive layer 6 with metal spindle 1. The conductive layer 6 can be of dielectric or metallic material and should be very thin, preferably less than one micron thick.

A transparent plastic edge A illustrated in the figure means that the intermediate prism for the signals sent by the stroboscopic device to the platter can be omitted as these signals are directly visible when the turntable speed requires adjustment to the desired values.

As shown in FIGS. 1 and 2, the plastic part 2 is in the form of a plastic disk with a lower surface which is raised with respect to an outer edge of the disk and an upper surface which has a central area (radially inwardly of edge B') which is lower than a plane containing the top surface of glass layer 5. Glass layer 5 is annular in shape and sits in an annular trough defined between edges B and B'. The transparent plastic edge A extends outwardly from a lower portion of the outer periphery of disk 2.

As is obvious to a person skilled in the art, the foregoing description and disclosure represent only one preferred embodiment of the invention. Numerous variations and modifications can be effected without departing from the true spirit and scope of the invention.

We claim:

1. A turntable platter comprising:
    a base disk having a center of rotation, a lower surface and an upper surface, said disk being made of plastic and including inner and outer edges extending upwardly from said upper surface defining an annular trough therebetween, said disk having an outer peripheral edge extending lower than a plane containing said lower surface of said disk, said outer peripheral edge being transparent;
    a glass layer member engaged with said upper surface of said disk in said annular trough and covering at least a portion of said top surface, said glass layer member being annular in shape and being positioned on an outer portion of said upper surface of said disk spaced away from said center of rotation, a portion of said upper surface of said disk adjacent said center of rotation being in a lower plane than a plane containing an upper surface of said glass layer member;
    adhesive between said base disk and said glass layer member for connecting said glass layer member to said disk; and
    an electrically conductive thin layer disposed on said upper surface of said glass layer and made of one of dielectric and metallic material and having a thickness which is less than micron.

* * * * *